C. F. JACOBS.
PROCESS FOR WELDING AND BONDING RAILS AND OTHER METAL PIECES.
APPLICATION FILED JUNE 28, 1907.
933,456.
Patented Sept. 7, 1909.
2 SHEETS—SHEET 1.
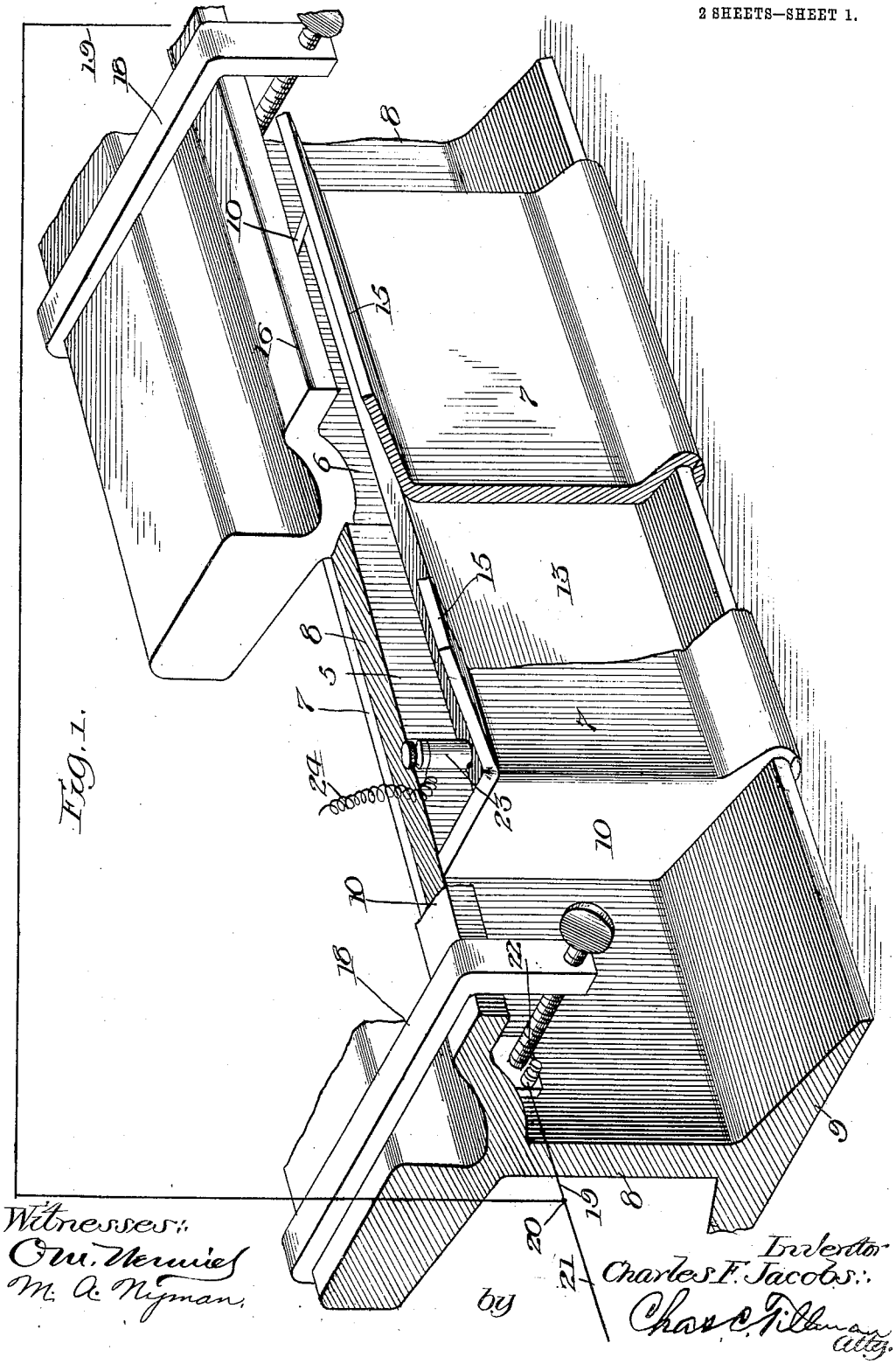

C. F. JACOBS.
PROCESS FOR WELDING AND BONDING RAILS AND OTHER METAL PIECES.
APPLICATION FILED JUNE 28, 1907.
933,456.
Patented Sept. 7, 1909.
2 SHEETS—SHEET 2.
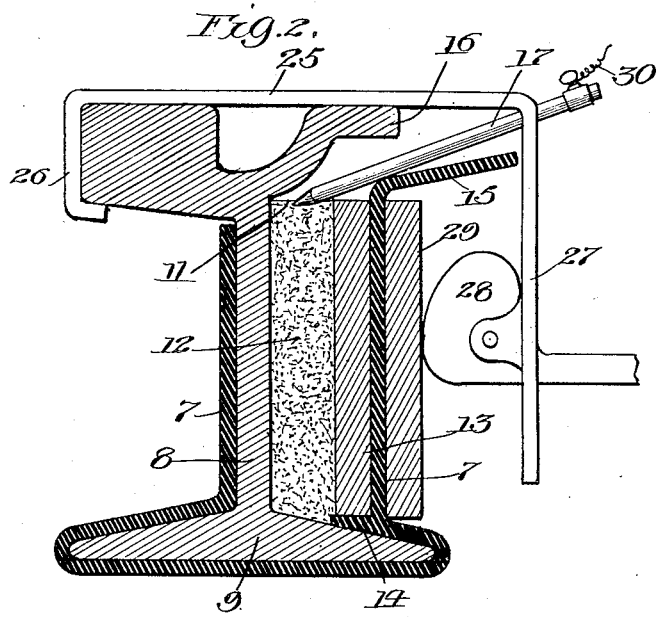
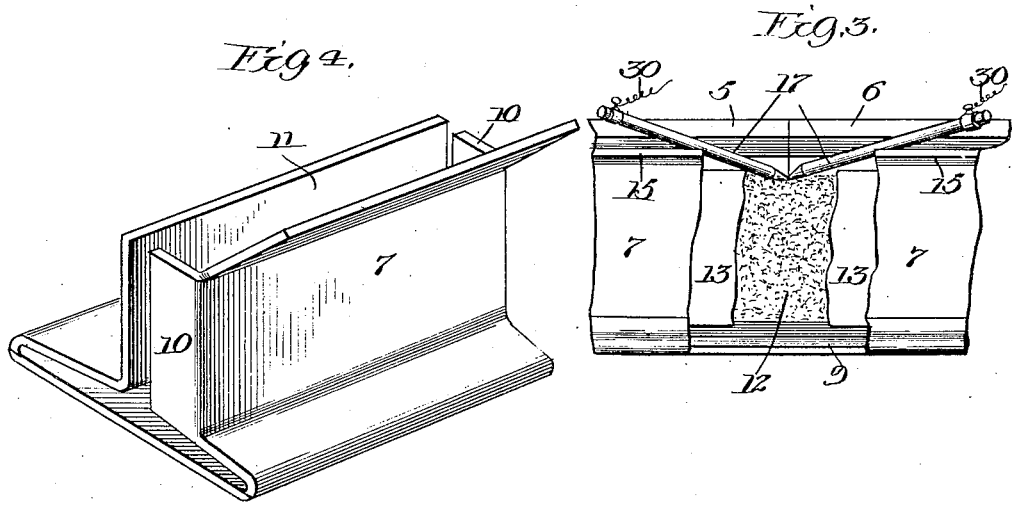
Witnesses
Inventor
Charles F. Jacobs
by Chas. C. Tillman atty

UNITED STATES PATENT OFFICE.

CHARLES F. JACOBS, OF CHICAGO, ILLINOIS, ASSIGNOR TO JACOBS WELDING COMPANY, OF CHICAGO, ILLINOIS, A CORPORATION OF ILLINOIS.

PROCESS FOR WELDING AND BONDING RAILS AND OTHER METAL PIECES.

933,456.   Specification of Letters Patent.   Patented Sept. 7, 1909.

Application filed June 28, 1907. Serial No. 381,229.

*To all whom it may concern:*

Be it known that I, CHARLES F. JACOBS, a citizen of the United States, residing at Chicago, in the county of Cook and State of Illinois, have invented certain new and useful Improvements in Processes for Welding and Bonding Rails and other Metal Pieces, of which the following is a specification.

This invention relates to improvements in a process for joining or uniting metal pieces, and while it is more especially intended for use in joining the rails of electric railways so as to render them practically continuous and adaptable for the transmission of electric currents, yet it is applicable for uniting rails or metallic pieces employed for other purposes; and it consists in certain novel features, acts, procedure and steps practiced in carrying out the invention.

The principal object of the invention is to provide a simple, inexpensive and efficient method for uniting or bonding metallic pieces, by the use of which, when employed for railway rails, a continuous rail with perfect and permanent electric conductivity will be afforded at a great saving in time, labor and expense.

In carrying out the process, it will be understood that any suitable apparatus may be employed for receiving the material used in the operation, and for practicing or carrying out the different steps of the process, and in the accompanying drawings I have shown one form of such devices, but I desire it to be understood that I do not wish to be limited thereto, as they may be varied, or other devices may be employed therefor, but to facilitate the explanation of the process so that it may be more easily and thoroughly understood, it is deemed necessary to illustrate one form thereof.

In the accompanying drawings—Figure 1 is a perspective view partly in section of a portion of two abutting railway rails, showing appliances in position thereon for the carrying out of my process. Fig. 2 is a cross-sectional view thereof taken near the juncture of the rail sections, and illustrating means for fusing the flux, as well as means for forcing the joining plate or bond against the web of the rails. Fig. 3 is a view in side elevation of a portion of the abutting ends of two rails, showing the mold and joining plate or bond broken away, and illustrating a pair of carbon sticks in position for fusing the flux; and Fig. 4 is a detached perspective view of the mold used for retaining the flux and joining plate or bond in position while the process is being carried out.

Like numerals of reference, refer to corresponding parts throughout the different views of the drawings.

The reference numerals 5 and 6 designate two railway rails to be joined, but which may be metallic pieces used for other purposes, and which have their ends abutted or closely approximated. Placed around the adjacent or meeting portions of the rails or pieces 5 and 6 is a form or mold 7, which may be of any suitable material, but preferably non-electric conducting, and is so constructed as to extend, when applied to rail sections, from the upper portion of one side of the webs or vertical ribs 8 of the rails around and under their bases 9, and up near the top of the webs or ribs of the rails on the opposite side thereof, as is clearly shown and will be readily understood by reference to Figs. 1, 2 and 4 of the drawings. The mold is provided at its ends with inturned portions 10 to abut against preferably one side only of the ribs 8 of the rails, so as to form a receptacle or compartment 11 for the reception of a suitable flux 12, and a joining plate or bonding piece 13, which plate or piece is located within the mold on the inner surface of one of its walls at a distance from the contiguous walls of the ribs 8 of the rails, and is supported at its lower edge by means of any inwardly extending ledge 14 with which the mold is provided. The upper edge of one side of the mold is formed with an outwardly extending flange 15, which is located at a sufficient distance below the upper portion of the flanges 16 of the rails, to permit of the passage of the flux 12 into the space 11 between the ribs 8 and the piece or plate 13, and also, when desired, for the insertion of a pair of carbon sticks or rods 17, as will be understood by reference to Figs. 2 and 3 of the drawings. The flange 15 of the mold is preferably downwardly and inwardly inclined, as shown, in order to guide the flux into the space 11, but it is evident that when metal pieces without heads or flanges on their upper ends are employed, the said flange will be unnecessary and may be omitted. Detachably secured to each of the pieces of metal 5 and 6, by means of a screw-clamp 18 or otherwise, is an electric conductor 19, the said conductors being joined as at 20 (see Fig. 1), and having a leader 21 from a source of electric supply, and each has its end electrically connected to an electrode 22 carried by the corresponding screw-clamp 18, as will be readily understood by reference to Fig. 1 of the drawings. While I have shown the conductors 19 as being held in electric connection with the pieces 5 and 6, by means of the clamp 18, yet it is apparent that they may be connected thereto by any other suitable means. The metallic plate or piece 13 is provided in its upper portion, and preferably near one of its ends, with a binding post 23 to which is connected an electric conductor 24, which also leads from a source of electric supply.

In Fig. 2 of the drawings I have shown a device applied to the rails or metal pieces to be joined, for forcing the welding or joining plate or bonding piece 13 against the sides of the webs 8 of the rails, which I may sometimes employ, and which consists of a strap or bracket 25, transversely disposed on the top of the rail or rails and having at one of its ends a hook 26 to engage one of the head flanges thereof, and its other end bent downwardly at a suitable distance from that side of the mold in which the plate or piece 13 is located. The downward extension 27 of the bracket 25 has fulcrumed thereon a cam-lever 28, which is adapted to impinge against a plate 29 located on the outer surface of the mold, so that by raising the outer end of said lever the cam 28 co-acting with the plate 29 will cause the mold to be crushed and the joining plate or bonding piece 13 pressed firmly against the webs 8 of the rails. The mold 7 is preferably made of plastic material, and the plate or bonding piece 13 is placed therein before the pieces of the mold are placed in position on the rails. As the mold is usually made of three pieces, that is, two upright side pieces and a base portion, as is clearly shown in Figs. 1 and 2 of the drawings, the parts thereof may be readily applied to the rails by causing the lower portions of the upright side pieces to engage the edges of the rail bases and by placing the base or bottom of the mold so as to rest against the lower surface of said bases, in which positions the parts of the mold may be held by means of clamps (not shown) or in any suitable manner.

When the abutting or closely approximated portions of the rails or pieces 5 and 6 to be joined have been surrounded or incased by the form or mold 7, so as to prevent leakage, and the joining plate or bonding piece 13, as before stated, has been located in the mold at a distance from the webs of the rails, a quantity of flux of any suitable kind, but preferably such as becomes an electric conductor when fused or melted, in a dry or powdered state, is placed in the space 11 between the webs 8 of the rails, and the piece or plate 13 and the carbon rods 17 placed in about the positions shown in Figs. 2 and 3 of the drawings, or so that two of their ends will meet and at the same time will be in contact with the flux 12 to the end that an arc will be furnished when the electric current is turned on through the conductors 30, which lead from a source of electric supply. The carbon rods 17 may be manipulated or supported by any suitable means.

It will be understood that the conductors 19 and 21, for the rails or pieces to be joined, the conductors 30 for the carbon sticks, and the conductor 24 for the bonding-piece or joining-plate, may all lead from the same source of electric supply, but so that the rails will be connected to one pole and the joining-plate to the other, and in such a manner that one of the carbon sticks will be connected to one pole and the other stick to the other pole, when by turning on the current to the rails 5 and 6 through the conductors 19 and 21, and through the conductors 30 to the carbon sticks, and through the conductor 24 to the joining plate or bonding piece 13, it is apparent that the carbon rods will produce an arc and cause the flux to be fused or melted, when by reason of the conductivity and other characteristics thereof, and while the current is passing through the flux it heats the flux to a high degree of temperature, which then heats the portions of the rails or metal pieces 5 and 6 adjacent to the plate 13, as well as said plate, to the required degree, when by forcing the plate 13, which may be done through the instrumentality of the bracket 25, cam-lever 28 and plate 29, or otherwise, against the webs 8 of the rails, they will be effectually welded or joined together. In the operation of forcing the plate 13 toward the sides of the webs 8, it is apparent that the mold will be crushed and that the flux which has become molten, will be forced from between the plate 13 and the webs 8 of the rails. In some instances I may use molten flux, and pour it into the space 11 between the plate 13 and webs 8 of the rails, in which operation it is obvious that the use of the carbon sticks 17 will be unnecessary.

As before stated, I do not desire to be limited to the apparatus herein disclosed for carrying out my process, nor do I desire to be limited to the kind of flux which I may use, as I may employ borax or any other suitable material or a compound of such materials.

Having thus fully described my invention, what I claim as new, and desire to secure by Letters-Patent, is—

1. The herein described process of welding and bonding rails and other metal pieces, which consists in supporting a joining-plate or bond-piece at a distance from one of the sides of the rails or metal pieces and across their joint, then applying flux between the joining-plate or bond-piece and the rails or metal pieces to be joined, then heating the joining-plate or bond-piece and the rails or metal pieces to be joined through the agency of the flux and by means of electric currents, and then forcing the joining-plate or bond-piece into contact with the rails or metal pieces across their joint.

2. The herein described process of welding and bonding rails and other metal pieces, which consists in supporting a joining-plate or bond-piece at a distance from one of the sides of the rails or metal pieces and across their joint, then applying a fusible flux between the joining-plate or bond-piece and the rails or metal pieces to be joined, then fusing said flux by means of an electric current, then heating the joining-plate or bond-piece and the rails or metal pieces to be joined through the agency of the flux and by means of electric currents, and then forcing the joining-plate or bond-piece into contact with the rails or metal pieces.

3. The herein described process of welding and bonding rails and other metal pieces, which consists in supporting a joining-plate or bond-piece at a distance from the rails or metal pieces and across their joint, applying flux between the joining-plate or bond-piece and the rails or metal pieces to be joined, passing an electric current from the joining-plate or bond-piece to the rails or other metal pieces through the instrumentality of the flux, and finally forcing the joining-plate or bond-piece into contact with the rails or metal pieces.

4. The herein described process of welding and bonding rails and other metal pieces, which consists in securing a form around the adjacent portions or abutting ends of the rails or other metal pieces, supporting a joining plate or bond piece in the form at a distance from the rails or metal pieces and across their joint, placing flux in the space between the joining plate and the rails or other metal pieces, heating the rails or other metal pieces to be joined and the joining plate through the agency of the flux and by means of an electric current, and then forcing the joining plate or bond piece into contact with the rails or metal pieces across their joint.

5. The herein described process of welding and bonding rails and other metal pieces, which consists in securing a form around the adjacent portions or abutting ends of the rails or metal pieces to be joined, supporting a joining plate or bond piece within the form at a distance from the rails or metal pieces, applying fusible flux between the joining plate or bond piece and the rails or other metal pieces to be joined, establishing an electric arc in close relation to the flux whereby heat is generated to fuse the flux between the joining plate and the rails, passing an electric current between the joining plate and rails through said flux and thereby heating said parts to the desired degree, and finally forcing the joining plate and rails together.

6. The herein described process of uniting metal pieces, which consists in heating the metal pieces to be united by placing a flux between them, passing a current from one of said pieces to the other through the flux, the resistance of the flux generating heat, and then bringing together the pieces to be united.

7. The herein described process of uniting metal pieces which consists in heating the metal pieces to be joined by means of interposed flux and an electric current, the said flux being maintained in a fused condition by the electric current, thereby heating the pieces to be joined, and then bringing together the pieces to be united.

CHARLES F. JACOBS.

Witnesses:
CHAS. C. TILLMAN,
M. A. NYMAN.